United States Patent
Bunker

(10) Patent No.: US 8,300,259 B2
(45) Date of Patent: Oct. 30, 2012

(54) METHODS AND SYSTEMS FOR USER CONTROLLED REPRODUCTION JOB REMOVAL

(75) Inventor: Keith G. Bunker, Hilton, NY (US)

(73) Assignee: Xerox Corporation, Norwalk, CT (US)

( * ) Notice: Subject to any disclaimer, the term of this patent is extended or adjusted under 35 U.S.C. 154(b) by 980 days.

(21) Appl. No.: 11/955,927

(22) Filed: Dec. 13, 2007

(65) Prior Publication Data

US 2009/0158277 A1    Jun. 18, 2009

(51) Int. Cl.
*G06K 15/00*    (2006.01)

(52) U.S. Cl. ................................. 358/1.16; 358/1.14

(58) Field of Classification Search .............. 358/442, 358/443, 1.15, 1.14, 1.13, 1.16, 1.18, 444, 358/404

See application file for complete search history.

(56) References Cited

U.S. PATENT DOCUMENTS

| | | | |
|---|---|---|---|
| 6,731,447 B2 | 5/2004 | Bunker et al. | |
| 7,072,054 B2 | 7/2006 | Bunker | |
| 7,242,488 B2 * | 7/2007 | Matsueda | 358/1.14 |
| 7,398,405 B2 * | 7/2008 | Aoki et al. | 713/320 |
| 7,408,666 B2 * | 8/2008 | Aiyama | 358/1.15 |
| 2001/0016928 A1 * | 8/2001 | Wada et al. | 714/718 |
| 2003/0053109 A1 * | 3/2003 | Lester et al. | 358/1.14 |
| 2003/0055890 A1 * | 3/2003 | Senda | 709/203 |
| 2005/0105123 A1 * | 5/2005 | Hosoi | 358/1.14 |
| 2006/0050307 A1 * | 3/2006 | Koike | 358/1.15 |
| 2007/0177197 A1 * | 8/2007 | Murahashi et al. | 358/1.15 |
| 2007/0188791 A1 * | 8/2007 | Utsunomiya et al. | 358/1.13 |
| 2008/0030781 A1 * | 2/2008 | Iwase et al. | 358/1.16 |
| 2008/0123130 A1 * | 5/2008 | Matsumoto et al. | 358/1.15 |
| 2008/0151293 A1 * | 6/2008 | Narukawa | 358/1.15 |

* cited by examiner

*Primary Examiner* — Jerome Grant, II
(74) *Attorney, Agent, or Firm* — MH2 Technology Law Group LLP

(57) ABSTRACT

A driver module can be configured to generate a driver interface. The driver module can be configured to include, in the interface, various menus, selectors, and buttons to allow the user to specify the parameters and settings of the job. The driver module can be configured to include, in the interface, an option for the user to remove a job, sent to the reproduction device, after the job is processed by the reproduction device.

7 Claims, 5 Drawing Sheets

METHODS AND SYSTEMS FOR USER CONTROLLED REPRODUCTION JOB REMOVAL

FIELD

This invention relates generally to reproduction devices and methods.

BACKGROUND

Many photocopiers, printers, multi-function devices (MFD) and other reproduction and printing devices now include non-volatile memory that allow the device and/or a user to store a job, such as a document image, to be processed by the device. Often, the printing device may store every job received. Many users are security conscious, and look to prevent others from viewing jobs sent to the device.

Image Overwrite is a feature that is provided by nearly every reproduction device and MFD vendor. When Image Overwrite is invoked, the device overwrites the document image stored in non-volatile memory (for example a hard drive or flash memory) when the job is complete. Currently, all image overwriting is out of the user's control. The machine typically has a policy set on it to always overwrite or to never overwrite. If a user sends a job, which includes a sensitive document, to the device and wishes to have the image overwritten, but the Image Overwrite feature isn't turned on, the user must ask a system administer to run an on-demand Image Overwrite. Additionally, the on-demand Image Overwrite overwrites the entire non-volatile memory of the device and may takes 20-40 minutes to complete. As such, a user has no method available to independently and efficiently remove jobs from reproduction devices. Accordingly, there is a need for methods and systems to allow a user to remove jobs from reproduction devices.

SUMMARY

An embodiment of the present disclosure is directed to a method for securing reproduction services. The method includes receiving a request to submit a job to a reproduction device and generating an interface to allow a user to select parameters of the job. The interface is configured to allow the user to select an option to remove the job from the reproduction device after processing by the reproduction device. The method also includes providing the interface to the user.

Another embodiment of the present disclosure is directed to a reproduction device. The reproduction device includes reproduction hardware for providing reproduction services and a non-volatile memory coupled to the reproduction hardware. The non-volatile memory is configured to store jobs to be processed by the reproduction hardware. The device also includes a driver coupled to the reproduction hardware and non-volatile memory. The driver is configured to receive a request to submit a job to a reproduction device; to generate an interface to allow a user to select parameters of the job, the interface being configured to allow the user to select an option to remove the job from the memory after processing by the reproduction hardware; and to provide the interface to the user.

Another embodiment of the present disclosure is directed to a system for securing reproduction services. The system includes an application interface. The application interface is configured to receive a request to submit a job to a reproduction device; to generate an interface to allow a user to select parameters of the job, wherein the interface is configured to allow the user to select an option to remove the job from the reproduction device after processing by the reproduction device; and to provide the interface to the user. The system also includes a control module coupled to the application interface. The control module is configured to instruct the application to generate the interface and provide the interface to the user.

Additional embodiments of the present disclosure will be set forth in part in the description which follows, and in part will be obvious from the description, or may be learned by practice of the embodiments. The embodiments will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the invention.

DETAILED DESCRIPTION

Embodiments of the present disclosure are directed to methods and systems for providing user-controlled job removal from a reproduction device. According to the embodiments, a driver module can be configured to generate a driver interface. The driver module can be configured to include, in the interface, various menus, selectors, and buttons to allow the user to specify the parameters and settings of the job. The driver module can be configured to include, in the interface, an option for the user to remove a job, sent to the reproduction device, after the job is processed by the reproduction device.

In response to the user's selection, the driver module can be configured to generate commands to specify the parameters and setting of the job. According to the embodiments, the driver module can be configured to receive the selection of the option to remove the job and generate a command to remove the job. For example, the driver module can be configured to generate an image overwrite command. After generating the commands, the driver module can be configured to transmit the commands, including the command to remove the job, and the job to the reproduction device.

By including an option to remove the job in the interface, the user can remove a job from the reproduction device without requesting assistance from an administrator. Further, the job removal can be expedited by selectively removing jobs instead of completely overwriting the entire non-volatile memory of the device. As such, the user can securely and efficiently manage jobs processed by the reproduction device.

Reference will now be made in detail to the exemplary embodiments of the present disclosure, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments. These embodiments are described in sufficient detail to enable those skilled in the art to practice the embodiments and it is to be understood that other embodiments may be utilized and that changes may be made without departing from the scope of the disclosure. The following description is, therefore, merely exemplary.

Figure 1:
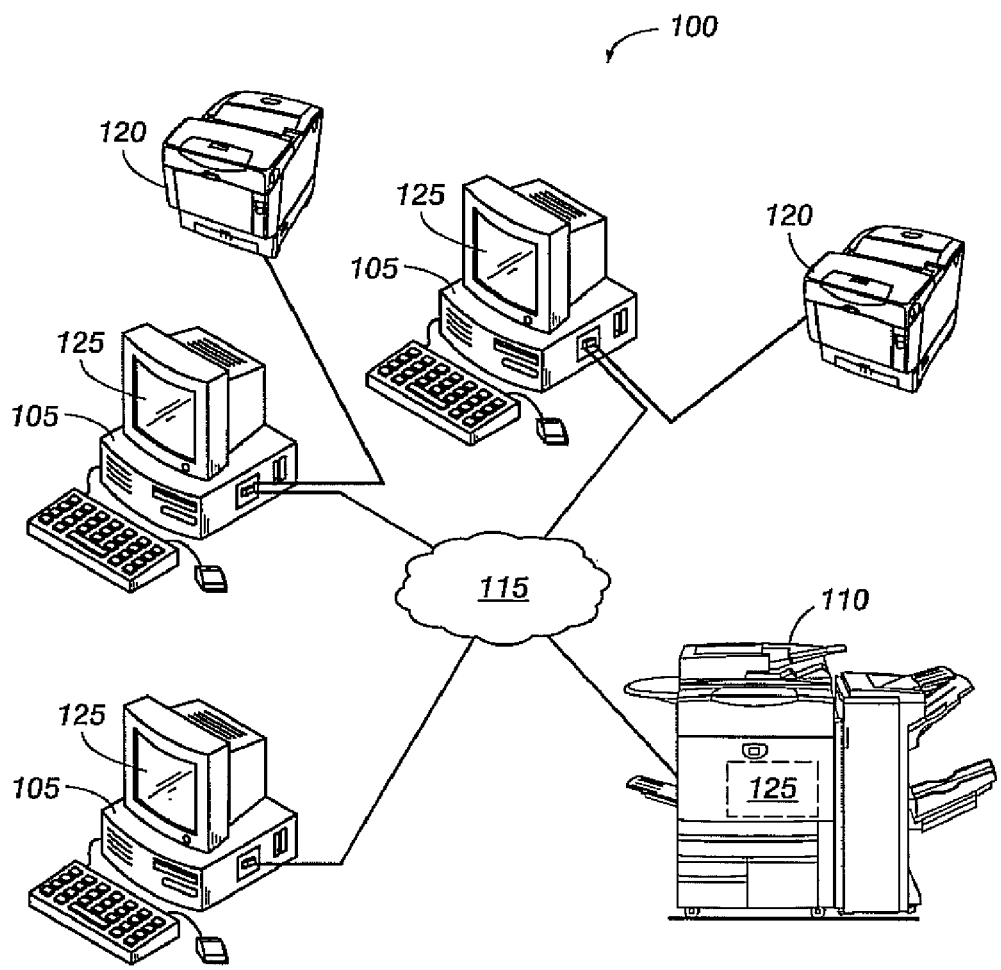
FIG. 1 is a diagram illustrating an exemplary system consistent with embodiments.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes user computing platforms 105, a multi-function device (MFD) 110, a network 115, and reproduction devices 120. Computing platforms 105 can be any type of computing devices capable of accessing and utilizing multi-function device (MFD) 110, network 115, and reproduction devices 120. For example, computing platforms can be personal computers, personal mobile devices, workstations or other networkable computing platforms. Users of computing platforms 105 can be private individuals, employees of private business or public entities or other persons interested in accessing and utilizing multi-function device (MFD) 110, network 115, and reproduction devices 120.

Network 115 can be a combination of wide area and local area networks such as the Internet. Network 115 can be configured to provide a communication channel between computing platforms 105 and MFD 110. Network 115 can implement a variety of network protocols to provide the communication channel such as Internet Protocol ("IP") Vx, ATM, SONET, or other similar network protocols.

MFD 110 can be any type of device configured to provide standalone document reproduction, document transmission, and document printing services. MFD 110 can be configured to communicate with computing platforms 105 via network 115. For example, MFD 110 can be a device that combines copying, facsimile, scanning, electronic mail (email), and printing processes. MFD 110 can include the hardware for performing the reproduction services. Additionally, MFD 110 can include a non-volatile memory for storing jobs to be processed by MFD 110.

Reproduction devices 120 can be any type of devices configured to provide direct reproduction, transmission, and printing services to computing platforms. Reproduction devices 120 can be configured to be connected directly to computing platforms 105. For example, reproduction devices 120 can be copying, scanning, facsimile, and printing devices. Further, computing platforms 105 can function as a server to allow other computing platforms 105 utilize reproduction devices 120. Reproduction devices 120 can include the hardware for performing the reproduction services. Additionally, reproduction devices 120 can include a non-volatile memory for storing jobs to be processed by reproduction devices 120.

Computing platforms 105 and MFD 110 can include a driver module 125. Driver module 125 can be configured to provide an interface between computing platforms 105 and MFD 110 or reproduction device 120. Driver module 125 can be configured to interact with applications residing on computing platforms 105 in order to convert a job into an appropriate format to be utilized by MFD 110 or reproduction device 120. Driver module 125 can be configured to allow user of computing platforms 105 to specify the parameters and settings of a job to be processed by MFD 110 and reproduction devices 120. In the embodiments described above and below, a job can mean one or more documents to be processed by MFD 110 or reproduction device 120. For example, driver module 125 can be configured to interact with a word processing application and convert one or more documents in the word processing format into a format, such as an image format, utilized by MFD 110 or reproduction device 120.

According to the embodiments, in order to allow the user to specify the parameters and settings of the job, driver module 125 can be configured to generate a driver interface. Driver module 125 can be configured to include, in the interface, various menus, selectors, and buttons to allow the user to specify the parameters and settings of the job. Driver module 125 can be configured to include, in the interface, an option for the user to remove a job, sent to MFD 110 or reproduction device 120, after the job is processed by MFD 110 or reproduction device 120.

In response to the user's selection, driver module 125 can be configured to generate commands to specify the parameters and setting of the job. Additionally, driver module 125 can be configured to receive the selection of the option to remove the job and generate a command to remove the job. For example, driver module 125 can be configured to generate an image overwrite command. After generating the commands, driver module 125 can be configured to transmit the commands, including the command to remove the job, and the job to the MFD 110 or reproduction device 120.

Figure 2:
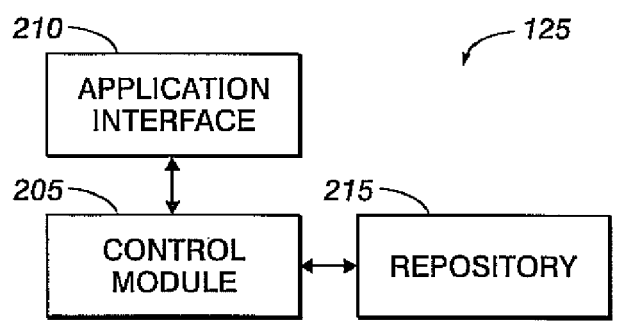
FIG. 2 is a diagram illustrating an exemplary driver module consistent with embodiments.

FIG. 2 depicts a more detailed block diagram of driver module 125 in accordance with another embodiment. It should be readily apparent to those of ordinary skill in the art that driver module 125 depicted in FIG. 2 represents a generalized schematic illustration and that other components may be added or existing components may be removed or modified.

As shown in FIG. 2, driver module 125 can comprise a control module 205, an application program interface ("API") 210, and a repository 215. It should be readily obvious to one of ordinary skill in the art that the modules 205-215 can be implemented as software applications (programmed in C, C++, JAVA, PHP, etc.), hardware components (EEPROM, application specific integrated circuit, microprocessor, etc.) or combinations thereof.

Control module 205 can be configured to manage and interface with the other modules 210 and 215 to provide the functionality of driver module 125 as described above and further described herein below. Control module 205 can be configured to receive a request, via API 210, to send a job to a reproduction device. In response, control module 205 can direct API 210 to generate a driver interface to allow a user to specify the parameters and settings of the job.

API 210 can be configured to generate a driver interface, e.g. menus and web pages, as required by control module 305. For example, API 210 can be configured to generate the driver interface to allow a user of computing platform 105 to specify a job to be processed by MFD 110 or reproduction device 120. API 210 can be configured to generate the driver interface to allow the user of computing platform 105 to select the parameters and settings of the job to be processed by MFD 110 or reproduction device 120. API 210 can generate the interface to include various menus, selectors, and buttons to allow the user to specify the parameters and settings of the job. API 210 can generate the interface to include an option for the user to remove a job, sent to MED 110 or reproduction device 120, after the job is processed by MFD 110 or reproduction device 120. An exemplary driver interface is shown in FIG. 3 and described below.

Figure 3:
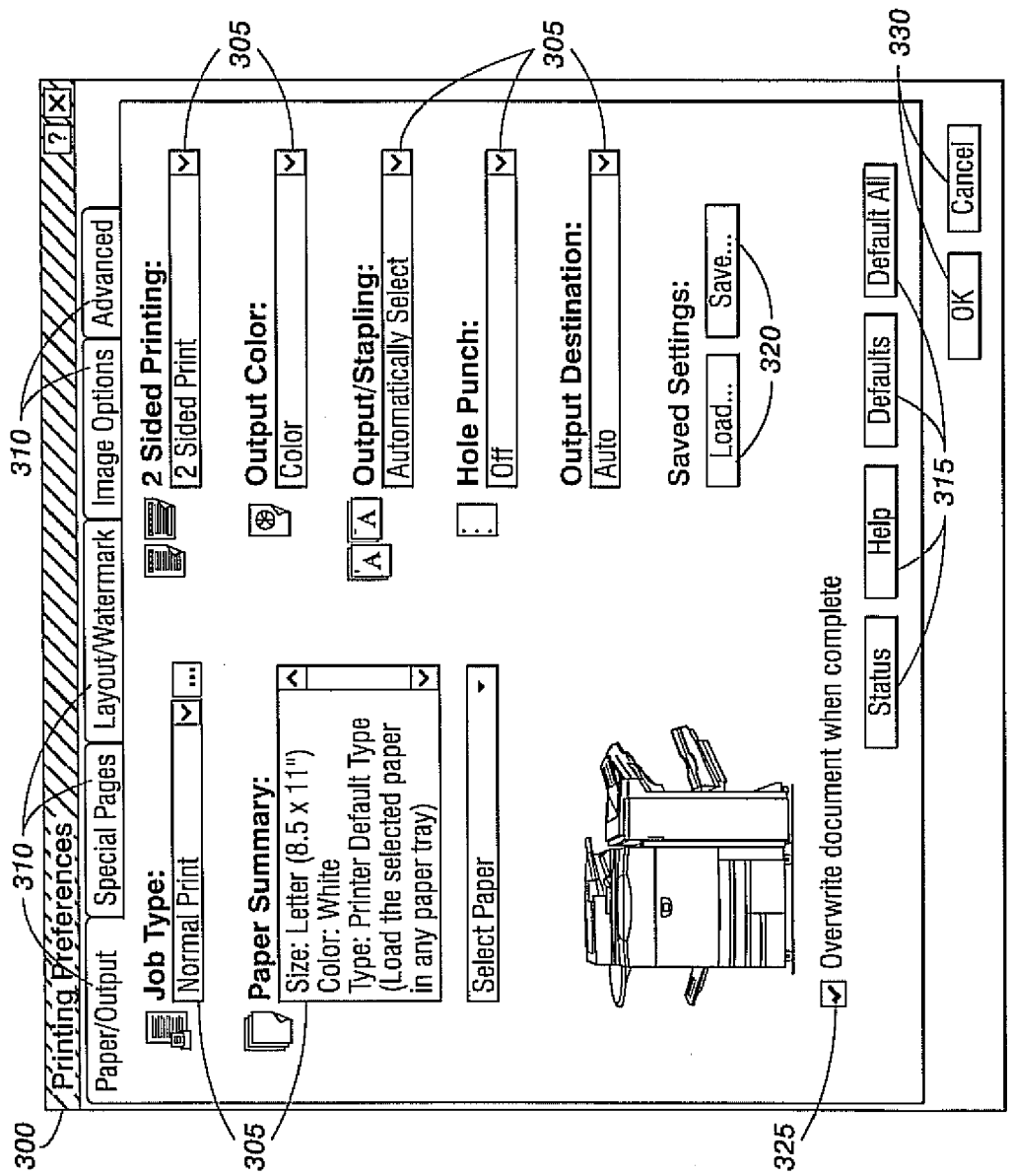
FIG. 3 is a diagram illustrating an exemplary interface consistent with embodiments.

FIG. 3 shows an example of a driver interface 300 in accordance with embodiments. It should be readily apparent to those of ordinary skill in the art that driver interface depicted in FIG. 3 represents a generalized schematic illustration and that other components may be added or existing components may be removed or modified.

As illustrated, driver interface 300 can include format menus 305, option tabs 310, information buttons 315, store setting buttons 320, job removal check box 325, and confirmation buttons 330. Format menus 305 allow the user to select the format and specification of the job. For example, format menus 305 can allow the user to select the paper specification of the job (type, size, hole punching, single/double sided, stapling, paper source), output destination, the color of the job, and the like. Option tabs 310 can include further parameters that can be specified for the job, such as special pages, image option, watermarking, and the like.

Information button 315 can include buttons that provide information on the job or the reproduction device. For example, information buttons 315 can include buttons that provide help information, status information on the reproduction device, and default settings.

Store setting buttons 320 can allow the user to store the current settings or load previously stored settings. For example, the user can select various parameters using menus 305, tabs 310, and check box 325. Then, a user can utilize buttons 320 to store the parameters selected. In response, driver interface 125 can store the selected parameters in repository 215. Additionally, a user can retrieve previously stored parameters utilizing store setting buttons 320.

According to the embodiments, interface 300 can include check box 325. A user can select check box 325 in order to instruct driver module 125 to generate a command, to be transmitted to the reproduction device, to remove the job after processing. For example, in response to selecting check box 325, driver module 125 can generate an image overwrite command. While interface 300 illustrates a check box 325 for selecting job removal, one skilled in the art will realize that any suitable mechanism can be utilized, such as button, toggle, and the like.

Once the user has selected the various parameters, the user can direct the driver module to generate the commands and send the job to the reproduction device by selecting confirmation buttons 330. For example, confirmation buttons 330 can include an "OK" button to accept the settings or a "Cancel" button to cancel the job.

Returning to FIG. 2, control module 205 can be configured to interact with repository 215 to retrieve commands to be sent to the reproduction device in response to the user's selections. Repository 215 can be configured to store commands for the parameters and settings of the job and commands for removing the job after processing. Additionally, repository 215 can store the identity, location, specifications, and configuration of various reproduction devices. For example, Table 1 illustrates several commands from Document Command Structure (DCS) syntax that can be generated by control module 205 in response to the user's selection and forwarded to a reproduction device with a job. The storage of these commands can be in any suitable format in the Repository 215. The generated commands must conform to the interface that the driver and machine implemented.

TABLE 1

| | |
|---|---|
| @PJL CCOMMENT XRXbegin | /*header is tell reproduction device to look for DCS commands*/ |
| @PJL COMMENT OID_ATT_JOB_OWNER "us80375g" | /*commands are in the format of attribute value pairs*/ |
| @PJL COMMENT XRXSTAPLE=PORTRAIT | /*command to reproduction device to staple the job*/ |
| @PJL COMMENT OID_ATT_SIDES 2 | /*command to reproduction device that the job is two-sided*/ |
| @PJL COMMENT OID_ATT_OVERWRITE TRUE | /*example of possible job removal command*/ |
| @PJL COMMENT XRXend | /*command to end the DCS command section*/ |

After control module 205 retrieves the commands, control module 205 can be configured to forward the commands to the reproduction device along with the job. Control module 205 can forward the commands to the reproduction device via API 210.

In FIG. 3 described above, driver interface 300 can be generated as a user utilizes various applications residing on computing platforms 105. For example, a user can be utilizing a word processing application and desire to print a document. As such, the user can select a print option in the word processing application. In response, driver module 125 can generate interface 300 and present the interface to the user. As such, driver module 125 can reside on computing platform 105.

Figure 4:
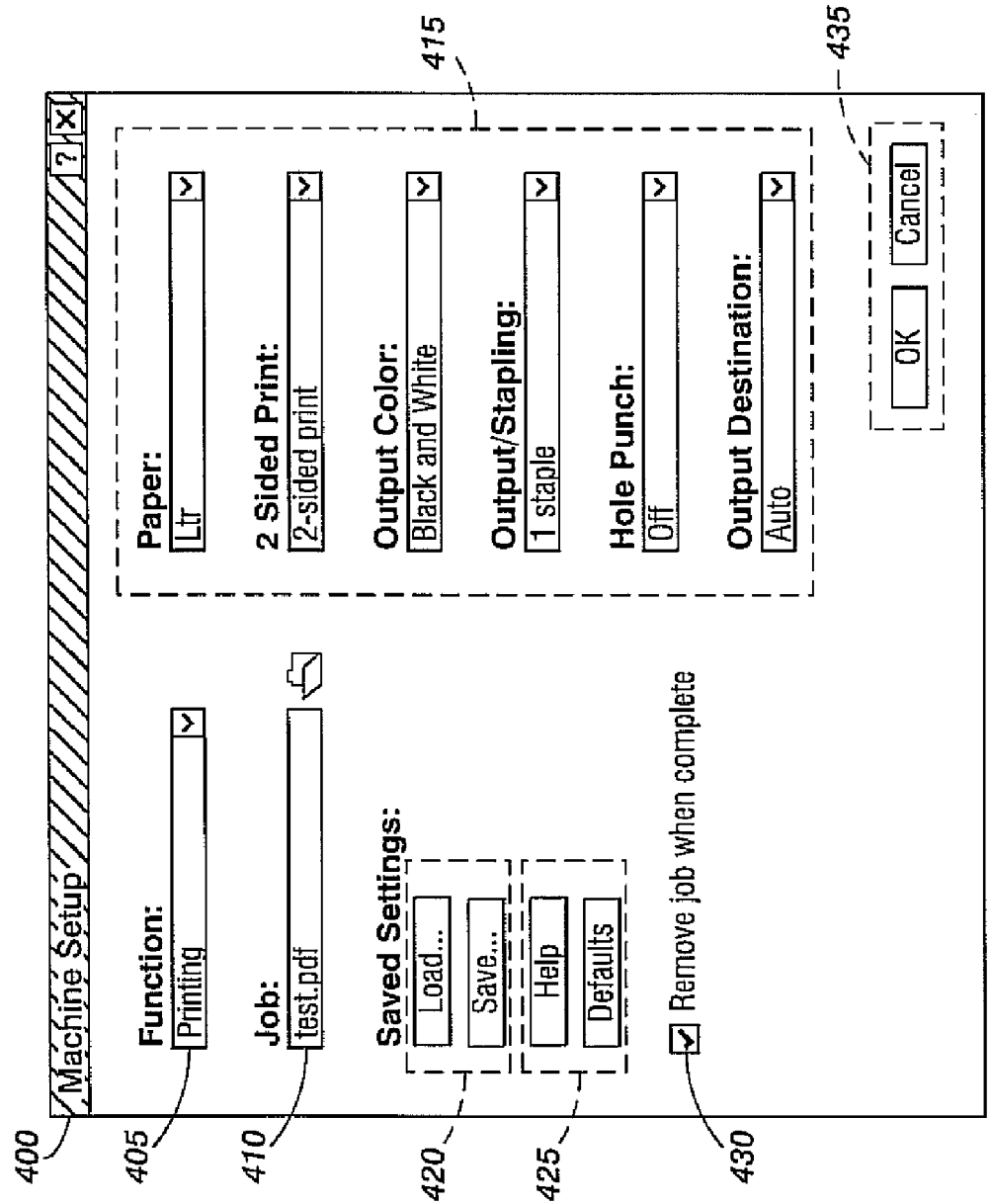
FIG. 4 is a diagram illustrating another exemplary interface consistent with embodiments.

Additionally, driver module 125 can reside on the reproduction devices such as MFD 110. As such, driver module 125 can generate a driver interface that can be accessed by computing platforms 105 via network 115. For example, driver module 125 can generate a driver interface in a web page format. As such, computing platforms 105 can utilize an application such as a web browser in order to submit jobs to MFD 110. FIG. 4 illustrates an exemplary driver interface that can be accessed via network 115.

FIG. 4 shows an exemplary driver interface 400 according to embodiments. It should be readily apparent to those of ordinary skill in the art that driver interface depicted in FIG. 4 represents a generalized schematic illustration and that other components may be added or existing components may be removed or modified.

As illustrated, driver interface 400 can include function menu 405, job selection menu 410, format menus 415, store setting buttons 420, information buttons 425, job removal check box 430, and confirmation buttons 435. Function menu 405 allows a user to select a function to be performed by MFD 110. For example, function menu 405 can include a list of functions such as printing, scanning, facsimile, email, and the like.

Job selection menu 410 allows the user to specify a job to be processed by MFD 110. For example, job selection menu 410 can allow the user to browse and select documents and files stored on computing platforms 105.

Format menus 415 allow the user to select the format and specification of the job. For example, format menus 415 can allow the user to select the paper specification of the job (type, size, hole punching, single/double sided, stapling, paper source), output destination, the color of the job, and the like.

Store setting buttons 420 can allow the user to store the current settings or load previously stored settings. For example, the user can select various parameters using menus 415 and 430. Then, a user can utilize buttons 420 to store the parameters selected. In response, driver interface 125 can store the selected parameters in repository 215. Additionally, the user can retrieve previously stored parameters utilizing store setting buttons 420.

Information button 425 can include a button that provides information on the job or the reproduction device. For example, information buttons 425 can include buttons that provide help information, status information on the reproduction device, and default settings.

According to the embodiments, interface 400 can include check box 430. A user can select check box 430 in order to instruct driver module 125 to generate a command, to be transmitted to the reproduction device, to remove the job after processing. For example, in response to selecting check box 430, driver module 125 can generate an image overwrite command. While interface 400 illustrates a check box 430 for selecting job removal, one skilled in the art will realize that any suitable mechanism can be utilized, such as button, toggle, and the like.

Once the user has selected the various parameters, the user can direct driver module 125 to generate the commands and send the job to the reproduction device by selecting confirmation buttons 435. For example, confirmation buttons 435 can include an "OK" button to accept the settings or a "Cancel" button to cancel the job.

Figure 5:
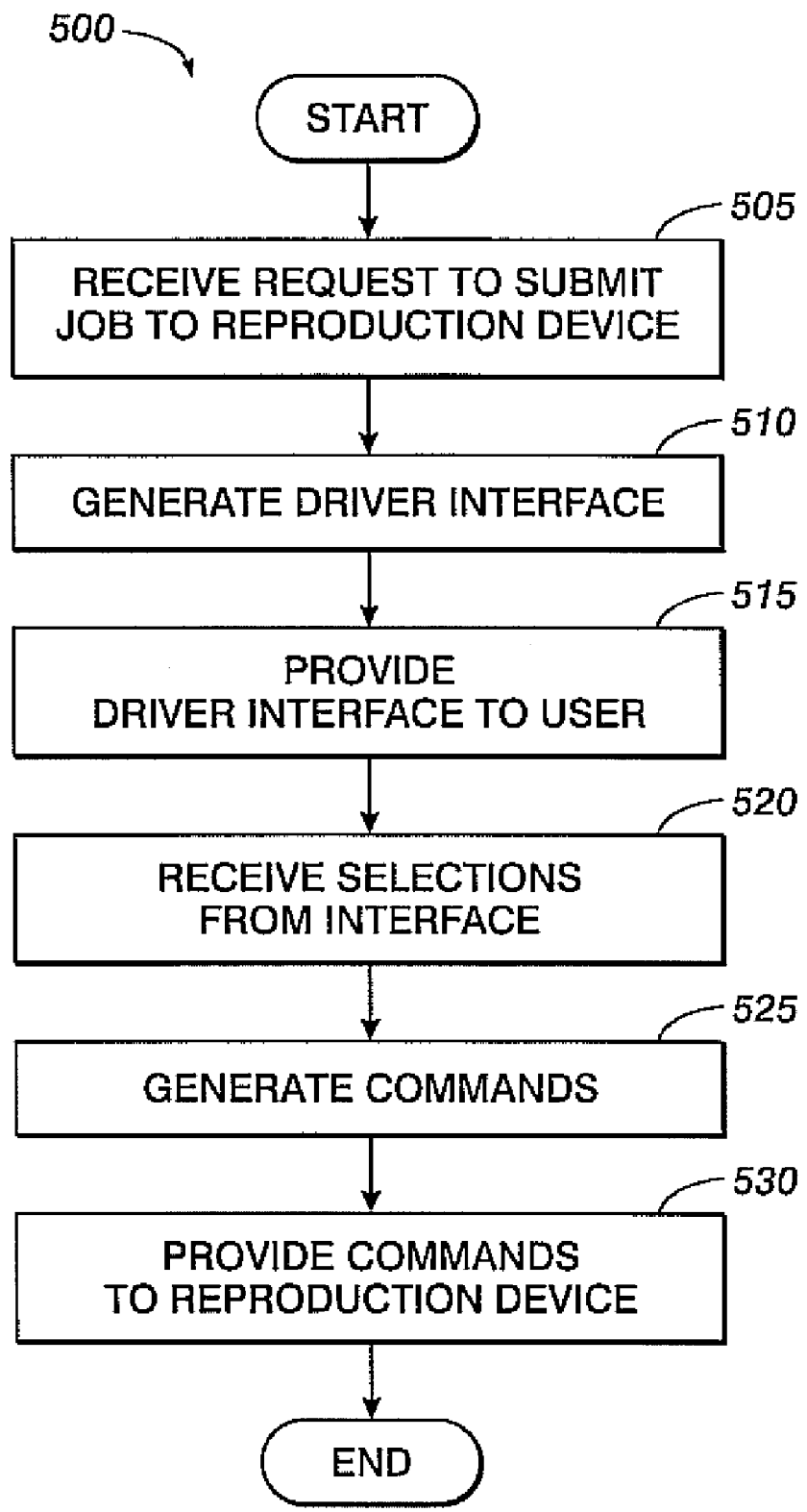
FIG. 5 is a flow diagram illustrating an exemplary process consistent with embodiments.

FIG. 5 shows an exemplary process 500 according to an embodiment. Exemplary process 500 illustrates the steps in which driver module 125 can generate a driver interface and generate commands based on selections in the interface.

Process 500 begins with driver module 125 receiving a request to submit a job to a reproduction device, in step 505. Driver module 125 can receive the request from an application operated by a user.

After receiving the request, in step 510, driver module 125 generates a driver interface to allow the user to specify parameters of the job. Driver module 125 can generate the driver interface by retrieving the configuration, capabilities, and settings of the reproduction device from repository 215. Driver module 125 also generates the driver interface to include an option to remove the job after processing.

Then, in step 515, driver module 125 provides the interface to the user. Driver module 125 can provide the interface to the user by passing the interface to the application utilized by the user or to another application to display the interface.

Once the user is provided with the interface, the user can select the various parameters of the job to be processed by the reproduction device. Once the user selects We parameters, in step 520, driver module 125 receives the selections made by the user in the interface. The selection can include the option to remove the job after processing.

After receiving the selections, in step 525, driver module 125 generates commands based on the selections. The commands instruct the reproduction device how to process the job. The commands can include a command to remove the job after processing. Driver module 125 can retrieve the commands from repository 215.

Then, in step 530, driver module 125 can provide the commands and the job to the reproduction device. The commands can include a command to remove the job after processing.

Figure 6:
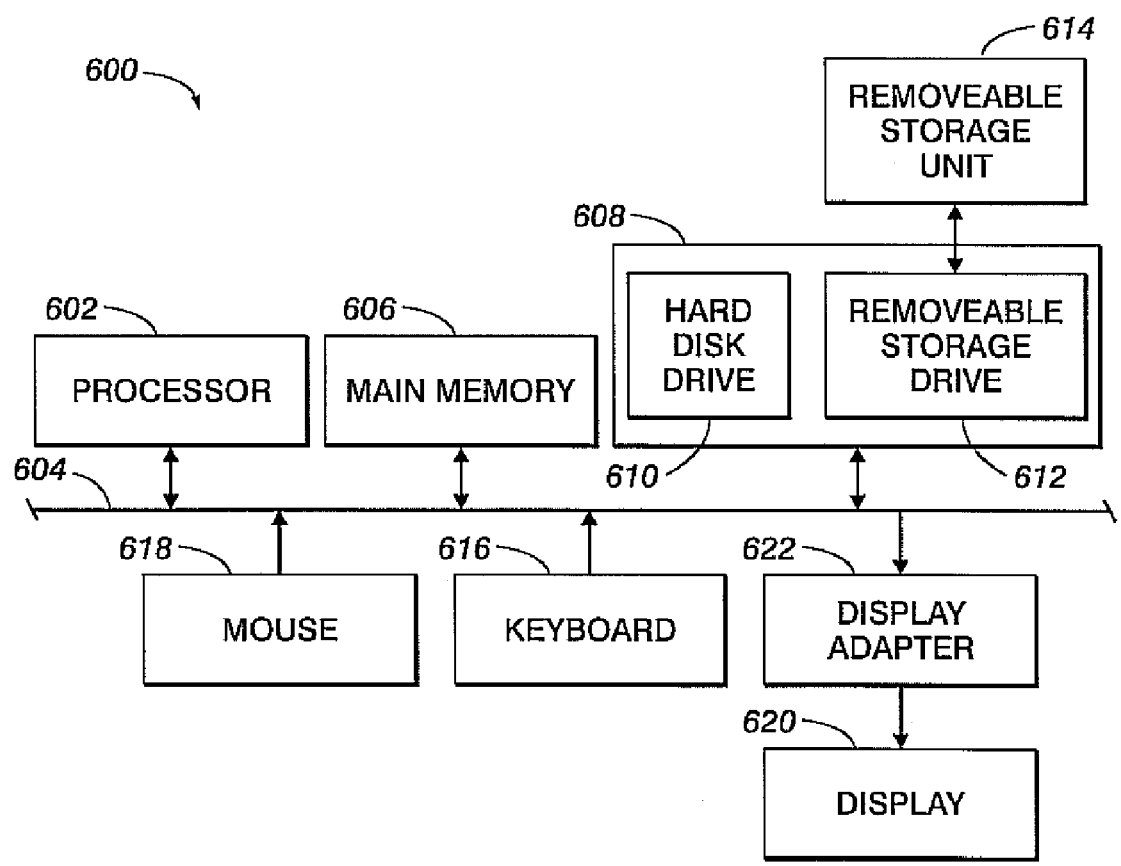
FIG. 6 is a diagram illustrating an exemplary computing platform consistent with embodiments.

FIG. 6 illustrates an exemplary block diagram of a computing platform 600 where an embodiment may be practiced. For example, computing platform 600 can be one of the computing platforms 105. The functions of driver module 125 can be implemented in program code and executed by computing platform 600. Driver module 125 can be implemented in computer languages such as PASCAL, C, C++, JAVA, etc.

As shown in FIG. 6, computing platform 600 includes one or more processors, such as processor 602 that provide an execution platform for embodiments of driver module 125. Commands and data from processor 602 are communicated over a communication bus 604. Computing platform 600 also includes a main memory 606, such as a Random Access Memory (RAM), where driver module 125 can be executed during runtime, and a secondary memory 608. Secondary memory 608 includes, for example, a hard disk drive 610 and/or a removable storage drive 612, representing a floppy diskette drive, a magnetic tape drive, a compact disk drive, etc., where a copy of a computer program embodiment for driver module 125 can be stored. Removable storage drive 612 reads from and/or writes to a removable storage unit 614 in a well-known manner. A user interfaces with driver module 125 with a keyboard 616, a mouse 618, and a display 620. Display adapter 622 interfaces with the communication bus 604 and display 620. Display adapter 622 also receives display data from processor 602 and converts the display data into display commands for display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Other embodiments of the present disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A method for securing reproduction services, comprising:
   receiving, at a computing system, a request to submit a job to a reproduction device;
   generating an interface to allow a user to select parameters of the job, wherein the interface is configured to allow the user to select an option to remove the job from the reproduction device after processing by the reproduction device;
   displaying the interface on a display coupled to the computing system to allow the user to view the interface;
   receiving selections made by the user via the interface, the selections including a selection of the option to remove the job from the reproduction device;
   retrieving, from a repository stored on the computing system, commands based on the selections that are compatible with the reproduction device, the commands including an image overwrite command corresponding to the selection of the option to remove the job from the reproduction device, wherein the image overwrite command causes the reproduction device to overwrite the job stored in non-volatile memory on the reproduction device; and
   transmitting, from the computing system, the commands and the job to the reproduction device for processing by the reproduction device.

2. A non-transitory computer readable medium comprising instructions for causing a one or more processors to perform the method of claim 1.

3. An apparatus, comprising:
   a memory storing instructions; and
   a processor configured to execute the instructions to perform the method of claim 1.

4. The method of claim wherein the interface includes a check box that allows the user to select the option to remove the job from the reproduction device after processing by the reproduction device.

5. The method of claim 1, wherein the interface is a graphical user interface.

6. A reproduction system, comprising:
   a reproduction device comprising:
      reproduction hardware for providing reproduction services; and
      a memory coupled to the reproduction hardware, wherein the memory is configured to store jobs to be processed by the reproduction hardware; and
   a computing system coupled to the reproduction device, wherein the computing system is configured to receive a request to submit a job to the reproduction device; to generate an interface to allow a user to select parameters of the job, the interface being configured to allow the user to select an option to remove the job from the memory after processing by the reproduction hardware; to display the interface on a display coupled to computing system to allow the user to view the interface; to receive selections made by the user via the interface, the selections including a selection of the option to remove the job from the memory; to retrieve, from a repository stored on the computing system, commands based on the selections that are compatible with the reproduction device, the commands including an image overwrite command corresponding to the selection of the option to remove the job from the memory, wherein the image overwrite command causes the reproduction device to overwrite the job stored in the memory; and to transmit, from the computing system, the commands and the job to the reproduction device for processing by the reproduction device.

7. A system for securing reproduction services, comprising:
   an application interface, the application interface configured to receive a request to submit a job to a reproduction device; to generate an interface to allow a user to select parameters of the job, wherein the interface is configured to allow the user to select an option to remove the job from the reproduction device after processing by the reproduction device; and to display the interface on a display to allow the user to view the interface;
   a repository for storing commands; and
   a control module coupled to the reproduction device, the application interface and the repository, the control module configured to instruct the application interface to generate the interface; to display the interface on a display to allow the user to view the interface; to receive selections made by the user via the interface, the selections including a selection of the option to remove the job from the reproduction device; to retrieve, from the repository, at least one of the commands based on the selections that are compatible with the reproduction device, the at least one of the commands including an image overwrite command corresponding to the selection of the option to remove the job from the reproduction device, wherein the image overwrite command causes the reproduction device to overwrite the job stored in non-volatile memory on the reproduction device; and to transmit the at least one of the commands and the job to the reproduction device for processing by the reproduction device.

* * * * *